United States Patent [19]

Leibundgut et al.

[11] 4,025,175
[45] May 24, 1977

[54] MACHINE FOR READING IMAGE CARRIERS

[75] Inventors: Max Leibundgut; Tony Reber, both of Zurich, Switzerland

[73] Assignee: A L O S AG, Switzerland

[22] Filed: Apr. 9, 1976

[21] Appl. No.: 675,346

[30] Foreign Application Priority Data

Apr. 11, 1975 Switzerland .............. 4618/75

[52] U.S. Cl. .............. 353/23; 353/95; 353 27 R
[51] Int. Cl.² .............................. G03B 1/48
[58] Field of Search .............. 353/95, 96, 27, 22, 353/23, 24, 25

[56] References Cited

UNITED STATES PATENTS

| | | |
|---|---|---|
| 3,413,061 | 11/1968 | Simpson et al. .............. 353/23 |
| 3,442,581 | 5/1969 | Smitzer et al. .............. 353/27 R |
| 3,446,552 | 5/1969 | Gross et al. .............. 353/27 R |
| 3,743,399 | 7/1973 | Smith .............. 353/23 |

Primary Examiner—Harry N. Haroian
Attorney, Agent, or Firm—Watson, Cole, Grindle & Watson

[57] ABSTRACT

Apparatus for reading images from an image carrier, such as a microfiche. The apparatus includes a mechanism for holding the image carrier between two glass plates as the carrier is moved across the optical plane of a corresponding optical system. These glass plates are pressed together in the area of the optical axis so as to ensure that the image carrier is held in a flat position when it is being viewed through the optical system. When the holding mechanism is moved to one end position so as to be substantially withdrawn from the reading apparatus, however, one of the glass plates is automatically swiveled out and away from the other glass plate so as to allow an image carrier to either be removed or inserted between the glass plates.

6 Claims, 3 Drawing Figures

MACHINE FOR READING IMAGE CARRIERS

BACKGROUND OF THE INVENTION

The present invention relates to a machine for reading images on an image carrier, such as a microfiche with a device for holding the image carrier between two glass plates which can be slid across the optical plane of an optical system.

Reading machines of this type and similar types are known, which are constructed such that a frame containing the glass plates for the holding device is supported along a horizontal plane in the machine in such a manner as to enable the frame to be moved both longitudinally and laterally. The base portion of the machine, therefore, must be of a sufficient size to allow the holding device for the microfiche to be moved along the base into any of one of a plurality of positions for viewing the desired image. These machines, however, present the disadvantage that the glass plates are bent by the pressure of the so-called floating optics; i.e. the optical system or at least a portion of it, since in order to keep the microfiche flat and to obtain an even sharpness of the image, the optical system rests and presses against the upper glass plate.

SUMMARY OF THE INVENTION

A primary object of the present invention is to avoid the disadvantage described above.

Another object of the present invention is to avoid this disadvantage by providing an improved machine in which the holding device for the microfiche freely projects in an upward direction out of the machine and renders it unnecessary to support the glass plate frame on all sides, while at the same time, however, the microfiche is kept level and flat at the relevant location, i.e. along the optical plane.

Additional considerations in constructing the reading machine and corresponding holding device are set forth below. When the holding device with the frame for the glass plates is adjusted in an upright position, leaning slightly towards the person using the machine, this person while seeking a certain micro-image by moving the holding device lengthwise and crosswise should be able to rest his elbows on a surface, thus greatly easing the burden of the searching process. To simplify handling of the machine, the holding device should consist of as few individual parts as possible. The holding device should be constructed in such a manner that the user can remove and replace the glass plates of the frame without using any tools, which was not possible with previously existing machines, since these generally utilize fastening elements such as screws, hinges and pivots to hold the parts of the holding device together. Finally, when the holding device is slid into a certain position, it should open automatically in that one glass plate should swivel away from the other thereby making it possible to insert or remove a microfiche.

The above objectives are accomplished by the construction of a reading machine with an appropriate holding device in accordance with the present invention. Thus, the reading machine includes an optical system, a holding device for holding the image carrier, the holding device extends in a substantially upright direction and includes the two glass plates and a mechanism for pressing the glass plates together in the area in which the image is being projected, thereby holding the microfiche flat in this area. This holding device includes a frame for holding the two glass plates. The first glass plate is wedged in the frame by spring pressure acting on the plane of the plates and presses the plate into a position in which the frame overlaps one of the edges of the first glass plate. The second glass plate is attached along one of its edges to a bar acting as a hinge element and, therefore, can be swiveled out of the plane of the frame. The bar overlaps the edge of the second plate on both sides and is clamped between a spring on the frame and the edge of the first glass plate in such a manner that the second glass plate is also pressed down against the first glass plate, and can be swiveled around its lateral edge into an open position. The bar also serves as a stop member of an opening mechanism so that when the holding device is slid into its end position, the glass plate automatically swivels upwardly into its open position when the portion of the bar projecting beyond the plane of the plate strikes against a counterstop of the opening mechanism.

The elements on the machine for holding the microfiche flat preferably are formed by a supporting body mounted on the machine casing beneath the wedged glass plate in the area of the optical condenser and a holder for the projecting lens. The supporting body also serves as a slide support for the wedged glass plate. The holder is attached to a swivel arm on which a pressing spring acts so as to cause one edge of the holder to be pressed against the swivel glass plate.

DESCRIPTION OF THE PREFERRED EMBODIMENTS

Figure 1:
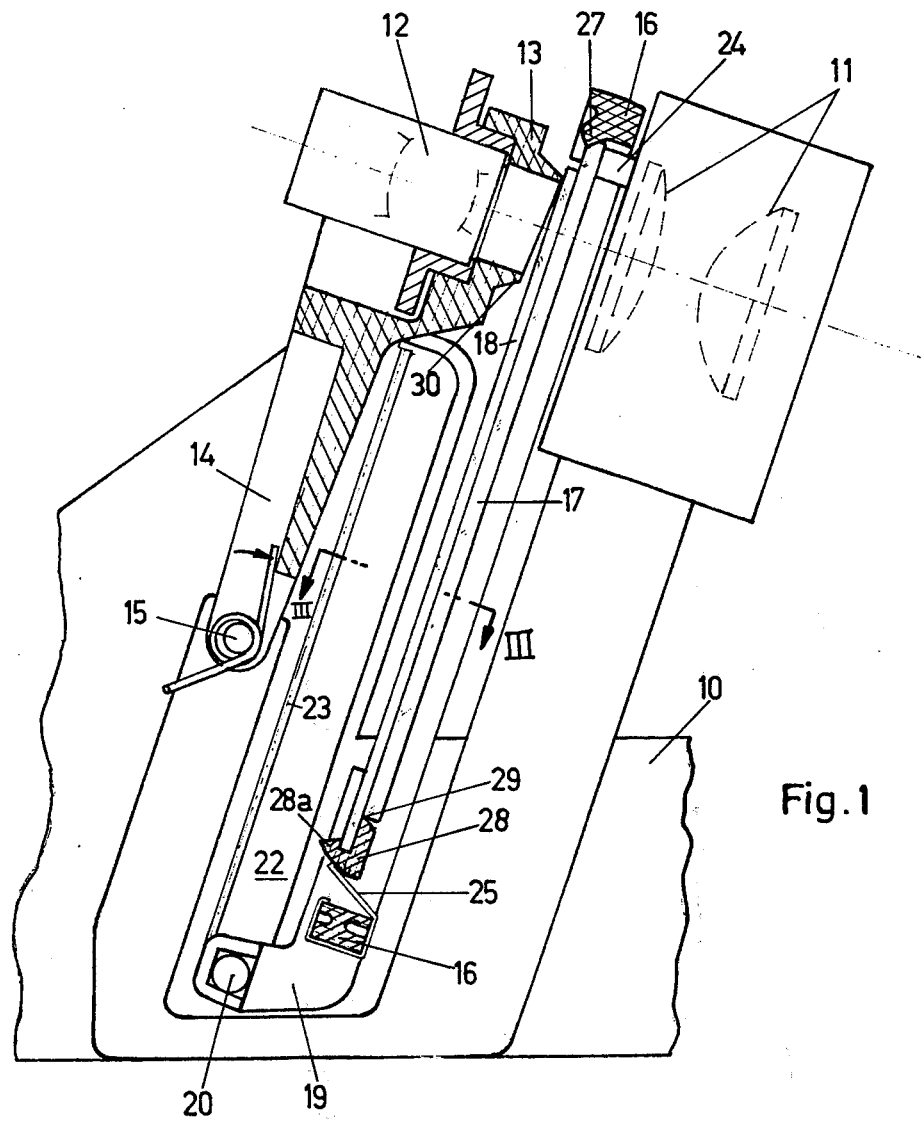
FIG. 1 is a partial sectional view along a vertical axis of the reading machine and corresponding holding device in accordance with the present invention, with the holding device in a working position with the glass plates lying one on top of the other.
Figure 2:
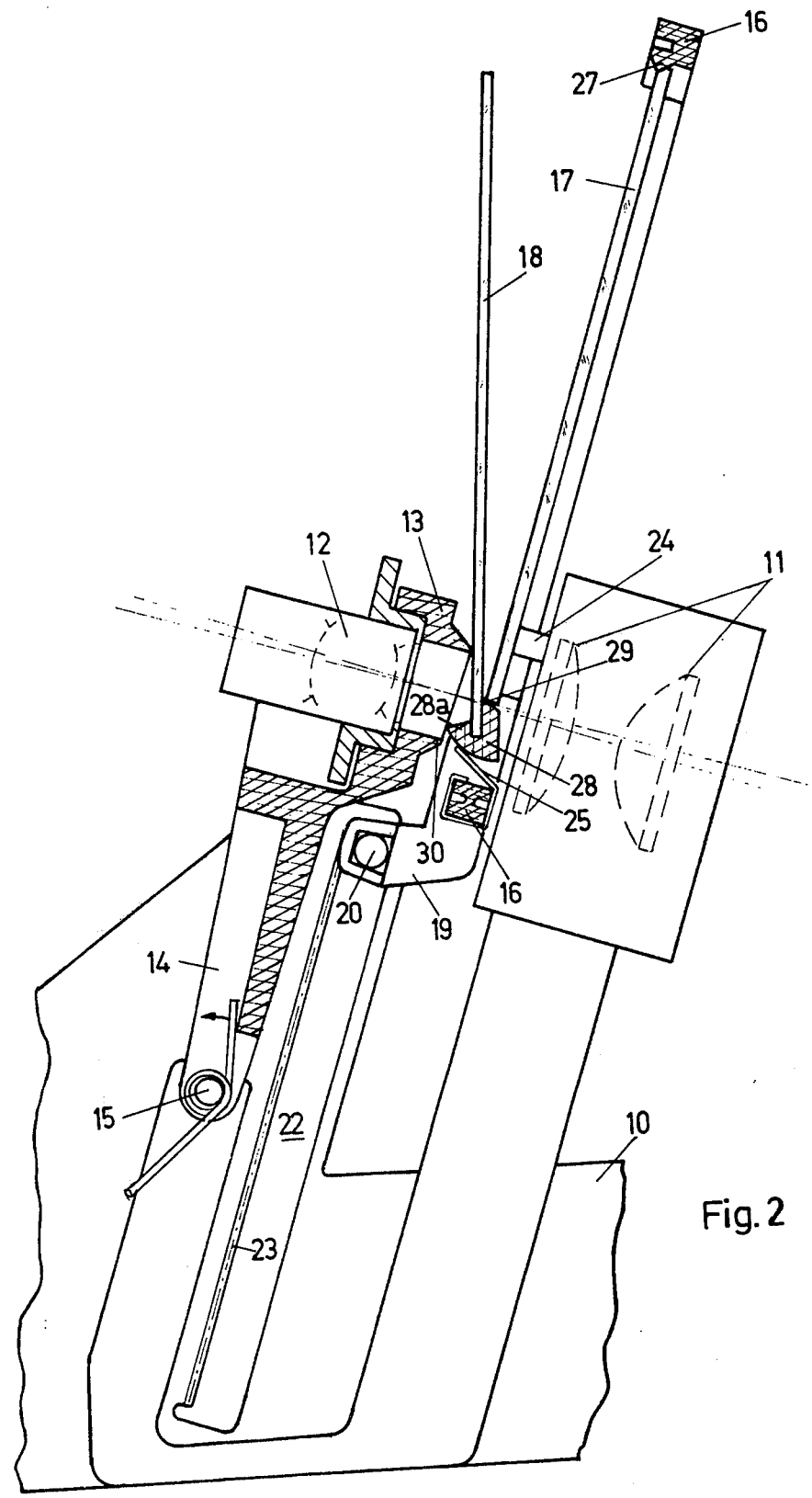
FIG. 2 is a view of the reading machine similar to the view in FIG. 1, with the holding device in an end position in which one glass plate automatically swivels away from the other for inserting and removing a microfiche.

As shown in FIGS. 1 and 2, the reading machine has a base portion 10 which is only partially illustrated, and a casing (not shown in the drawings) that contains an optical condenser 11 consisting of two or more lenses mounted in a stationary manner on base portion 10. Opposite to condenser 11 and coaxial with the optical axis of the condenser is a projecting lens 12 mounted in a holder 13. Holder 13 is mounted on a swivel arm 14 that swivels around a pivot axis 15. A torsion spring on the axis (not shown in the drawings) exerts pressure on swivel arm 14 so as to press holder 13 towards condenser 11.

The holding device for the microfiche is movably mounted between condenser 11 and lens holder 13. This holding device has rectangular frame 16 (shown in section in the Figures), which is preferably made of plastic, and two glass plates 17 and 18 held in the frame. The microfiche not shown in the drawings, is held between glass plates 17 and 18.

The optical axis of condenser 11 and projecting lens 12 is inclined upwardly by an acute angle of preferably 18° A in relationship to the horizontal plane. When the machine is utilized, the user is positioned in the area of the right edge of FIGS. 1 and 2 and moves frame 16, which is upright and sightly inclined toward him, while resting his elbows on the base of the table (not shown in the drawings) on which the reading machine is standing. In this manner, it is both more comfortable and easier to operate the reading machine, especially since the projected image on the ground-glass plate, which is located to the left and above lens 12, moves in a plane approximately parallel to the plane of frame 16 during the selecting process.

Figure 3:
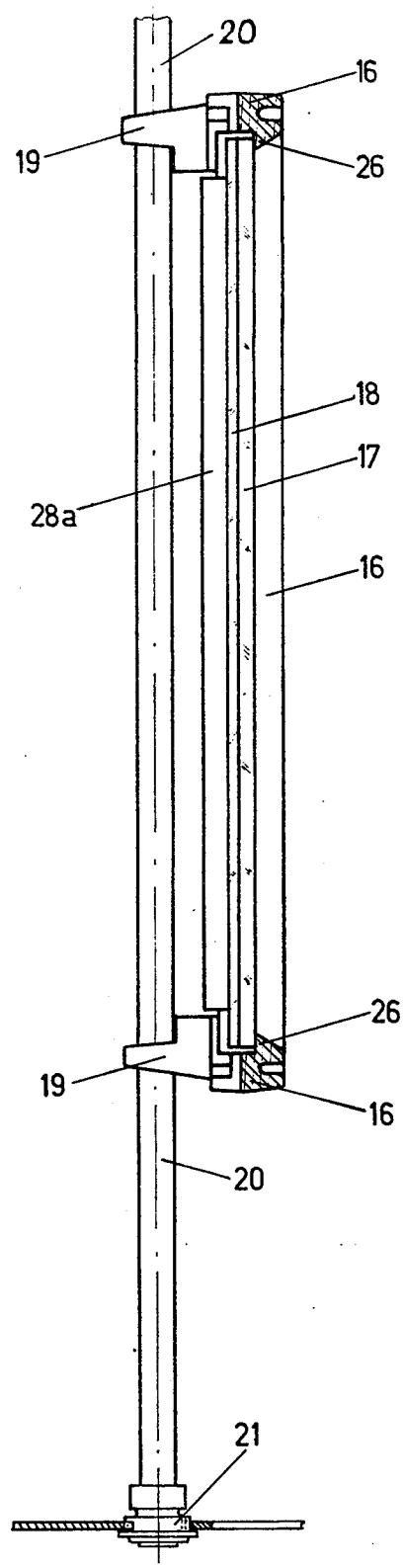
FIG. 3 is a sectional view along lines III—III in FIG. 1 and illustrates the frame of the holding device with its slide elements.

To find a desired image on the microfiche, frame 16 of the holding device must be moved in the reading machine in two perpendicular directions. As can be seen from FIGS. 1 and 2, frame 16 can be moved out of the position shown in FIG. 1, in an oblique upwardly direction out of the reading machine into the position shown in FIG. 2; this represents one of the directions of movement. To make it possible to move frame 16 in the horizontal direction at the same time, the frame has a mounting eye 19 projecting out of the plane of the frame on each bottom corner. Only one of the mounting eyes is visible in the side views of FIGS. 1 and 2. As can be seen from FIG. 3, a shaft 20 extends through the two mounting eyes 19, and a toothed wheel 21 is attached to each end of the shaft. Each of these toothed wheels turns in a guide groove 22 in the base portion of reading machine 10. One interior surface 23 of each of the guide grooves is toothed so as to mesh with the teeth of toothed wheels 21 when the frame is slid upwardly or downwardly in the reading machine. The movement of the frame in the horizontal direction is achieved simply by pushing the frame along shaft 20 on which it is held by means of mounting eyes 19.

In order to hold the microfiche flat between the glass plates at the location of the image to be projected, the two glass plates must be pressed together in the area of this projected image. For this purpose, there is a supporting body 24 on the machine casing in front of condenser 11, on which body glass plate 17 slides upon movement of frame 16, while counterpressure is supplied by lens holder 13 pressing against glass plate 18. The pressure from lens holder 13 is created by the spring pressure exerted on swivel arm 14 on which the lens holder is mounted.

To make it possible to remove and re-insert glass plates 17 and 18 from frame 16, for instance for cleaning purposes, without requiring any tools, the two glass plates are held in the frame simply by means of a leaf spring 25 attached to the underside of the frame. As can be seen from the horizontal section through the frame of FIG. 3, glass plate 17 rests on an inwardly projecting edge 26 of frame 16 only along two opposite perpendicular edges. To prevent glass plate 17 from falling out to the other side, it is pressed by leaf spring 25, mounted on the lower side of the frame, against the upper side of the frame into a position in which an edge 27 of the frame overlaps the beveled upper edge of glass plate 17. Edge 27 projects inwardly and is also beveled on the inside. Thus the glass plate is wedged in the frame as can be seen from FIGS. 1 and 2. Leaf spring 25 exerts its pressure on a bar 28 that overlaps the other glass plate 18 on both sides of its lower edge. Bar 28 is also adjacent to the lower edge of glass plate 17. Because of the position of the point of action of leaf spring 25 on bar 28, glass plate 18 connected with bar 28 is pressed against glass plate 17. Bar 28 acts as a hinge element and permits a swiveling movement of swivel galss plate 18 around lateral edge 29 of glass plate 17 which faces plate 18. Furthermore, part 28a of the bar that projects above the plane of glass plate 18 serves as a stop which, when the frame is pulled up out of the reading machine, interacts with edge 30 of lens holder 13. When bar part 28a strikes edge 30, it causes an automatic swiveling of glass plate 18 into its open position so that a microfiche can be inserted between or removed from the glass plates.

In order to be able to remove the glass plates from the frame for cleaning or some other purpose, it is necessary to hold the glass plates between the thumb and fingers with the frame projecting out of the reading machine but not pulled out entirely, and to slightly press them in a downward direction against the action of spring 25, so that wedged glass plate 17 comes loose from projecting edge 27 of frame 16. Since edge 27, like the glass plate edge, is beveled off in a wedge-shape, even a slight pressure exerted by the thumb on the backside of glass plate 17 is sufficient as the plate is being pressed downwardly, to enable the plate to be removed toward the front.

Leaf spring 25 is attached by being wrapped around the lower side of frame 16, so that this side is firmly encompassed by the attachment end of the spring. The spring preferably extends over the entire length of this side of frame 16. Bar 28 should then be at least as long as spring 25. Of course, shorter segments of springs and bars can be provided at intervals along the edge of the frame and glass plate. Further as a modification of the embodiment, the spring can be directly cast onto the frame, which is preferably made of a plastic material.

The reading machine described above has the special advantage that the glass plates of the holding device can be easily and rapidly changed without the necessity of any special tools. The microfiche is also held flat between the glass plates at the appropriate spot by simple means. The set-up of the holding device furthermore simplifies the operation of the machine since the frame can be moved for seeking out the desired image by a person who can rest his arms on a surface.

It is noted that the above description and the accompanying drawings are provided merely to present exemplary embodiments of the present invention and that additional modifications of such embodiments are possible within the scope of this invention without deviating from the spirit thereof.

We claim:

1. Apparatus for reading images from an image carrier, the apparatus including an optical reading system having a condenser and a projecting lens, the apparatus comprising:

means for holding an image carrier, said holding means extending in a substantially upright direction and including two glass plates between which the image carrier can be arranged, a frame overlapping an upper horizontal edge of a first of said glass plates for holding such plate, spring means for causing said first glass plate to be clamped within said frame, hinge means connected to a lower horizontal edge of the second of said glass plates and enabling said second glass plate to be swiveled out of the plane of said frame away from said first glass plate at its upper end, said hinge means being arranged between said spring means and a lower horizontal edge of said first glass plate, said spring means further pressing said second glass plate against said first glass plate, and said frame with said glass plates being slidable up and down across the optical plane of the optical system;

means for pressing said glass plates towards each other in the area of the optical plane of the optical system as said glass plates are slidably moved past the optical plane so that the image carrier is held in a flat position between said glass plates and so that the swivelling of said second glass plate can only occur when said holding means is slid into its uppermost end position with respect to said reading apparatus; and means serving to automatically cause said second glass plate to swivel away from said first glass plate as said holding means is moved into said end position.

2. Apparatus as defined in claim 1, wherein said means for pressing said glass plates towards each other includes: a supporting body located on the outer side of said first glass plate in the area of the condenser of the optical system, said first glass plate being slidable along said supporting body; a swivel arm; a holder for the projecting lens of the optical system, said holder being mounted on said swivel arm and pressed against said second glass plate; and a pressure spring for pressing said swivel arm, said holder and said second glass towards said first glass plate.

3. Apparatus as defined in claim 1, wherein: said hinge means is a hinge member having a rounded exterior surface; said spring means is a leaf spring; both said hinge member and said leaf spring are mounted within said frame; and said leaf spring has one end freely extending within said frame, said free end of said leaf spring being pressed against said rounded exterior surface of said hinge member.

4. Apparatus as defined in claim 3, wherein said hinge member and said leaf spring extend along at least a substantial portion of the lower horizontal edge of said second glass plate.

5. Apparatus as defined in claim 2, wherein said hinge means include a hinge member and said means for causing said second glass plate to automatically swivel into its open position is formed by the lens holder cooperating with said hinge member, such that when said holding means is moved into its uppermost end position in which said second glass plate is to be swiveled away from said first glass plate, said hinge member strikes an edge of the lens holder thereby causing the hinge member to swivel said second glass plate into its open position.

6. Apparatus as defined in claim 1, wherein said frame has a projecting mounting member arranged on each of its two corners of its edge adjacent to said hinge means; and further comprising: means for moving said frame in a horizontal direction across the optical plane of the optical system, said moving means including a horizontal shaft on which said projecting mounting members are slidable, a tooth wheel mounted on each end of said shaft for rotatable movement in a direction perpendicular to the axis of said shaft and guide grooves having an inner surface with a series of spaced teeth, said grooves extending in a direction along the axis of said up and down movement of said holding means, and said teeth on said tooth wheels being arranged in engagement with the teeth along said inner surfaces of said guide grooves.

* * * * *